(12) United States Patent
Hupka et al.

(10) Patent No.: US 9,290,661 B2
(45) Date of Patent: Mar. 22, 2016

(54) FIBRE-REINFORCED COMPOSITE COMPONENTS AND PRODUCTION THEREOF

(71) Applicant: Bayer MaterialScience AG, Leverkusen (DE)

(72) Inventors: Florian Hupka, Düsseldorf (DE); Marcel Schornstein, Neuss (DE); Dirk Wegener, Monheim (DE); Harald Rasselnberg, Dormagen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 14/422,404

(22) PCT Filed: Aug. 16, 2013

(86) PCT No.: PCT/EP2013/067163
§ 371 (c)(1),
(2) Date: Feb. 19, 2015

(87) PCT Pub. No.: WO2014/029701
PCT Pub. Date: Feb. 27, 2014

(65) Prior Publication Data
US 2015/0218375 A1    Aug. 6, 2015

(30) Foreign Application Priority Data

Aug. 20, 2012   (EP) .................................... 12180970

(51) Int. Cl.

| | |
|---|---|
| *B32B 27/04* | (2006.01) |
| *B32B 27/40* | (2006.01) |
| *C08L 79/04* | (2006.01) |
| *C08G 18/58* | (2006.01) |
| *C08J 5/24* | (2006.01) |
| *C08G 18/40* | (2006.01) |
| *B29C 70/46* | (2006.01) |
| *B29C 70/48* | (2006.01) |
| *C08L 63/00* | (2006.01) |
| *C08L 75/04* | (2006.01) |
| *B29K 63/00* | (2006.01) |
| *B29K 75/00* | (2006.01) |
| *B29K 105/08* | (2006.01) |

(52) U.S. Cl.
CPC ................. *C08L 79/04* (2013.01); *B29C 70/46* (2013.01); *B29C 70/48* (2013.01); *C08G 18/4045* (2013.01); *C08G 18/58* (2013.01); *C08J 5/24* (2013.01); *C08L 63/00* (2013.01); *C08L 75/04* (2013.01); *B29K 2063/00* (2013.01); *B29K 2075/00* (2013.01); *B29K 2105/089* (2013.01); *C08J 2375/04* (2013.01); *C08L 2205/03* (2013.01)

(58) Field of Classification Search
None
See application file for complete search history.

(56) References Cited

U.S. PATENT DOCUMENTS

| | | | |
|---|---|---|---|
| 5,071,939 A | 12/1991 | Fukami et al. | |
| 5,223,598 A * | 6/1993 | Yamada | C08G 18/165 528/48 |
| 5,468,832 A | 11/1995 | Schrader et al. | |
| 5,714,565 A * | 2/1998 | Nodelman | C08G 18/1875 524/770 |
| 2013/0244520 A1 | 9/2013 | Lindner et al. | |
| 2015/0225566 A1 | 8/2015 | Hupka et al. | |

FOREIGN PATENT DOCUMENTS

| | | |
|---|---|---|
| DE | 4416323 A1 | 11/1995 |
| WO | WO-2008147641 A1 | 12/2008 |
| WO | WO-2012022683 A1 | 2/2012 |

OTHER PUBLICATIONS

International Search Report for PCT/EP2013/067163 mailed Jan. 2, 2014.

* cited by examiner

*Primary Examiner* — Michael J Feely
(74) *Attorney, Agent, or Firm* — Drinker Biddle & Reath LLP

(57) ABSTRACT

The invention relates to fiber-composite components, obtained for example by impregnating fibers with a reaction resin mixture of polyisocyanates, polyepoxides, polyols, latent catalysts and optionally additives. The invention also relates to a method for producing said components.

5 Claims, No Drawings

FIBRE-REINFORCED COMPOSITE COMPONENTS AND PRODUCTION THEREOF

CROSS-REFERENCE TO RELATED APPLICATIONS

This application is a national stage application (under 35 U.S.C. §371) of PCT/EP2013/067163, filed Aug. 16, 2013, which claims benefit of European Application No. 12180970.1, filed Aug. 20, 2012, both of which are incorporated herein by reference in their entirety.

The present invention relates to fiber composite components obtainable, for example, by impregnating fibers with a reactive resin mixture composed of polyisocyanates, polyepoxides, polyols, latent catalysts and optionally additives, and to a process for production thereof.

Polymer-based fiber composite materials are frequently used as construction material, since they have high mechanical strength combined with low weight. The matrix material typically consists of unsaturated polyester resins, vinyl ester resins and epoxy resins.

Fiber composite materials can be used, for example, in aircraft construction, in automobile construction or in rotor blades of wind power plants.

DE-A 4416323 describes heat-curable reactive resin mixtures comprising organic polyisocyanates, organic compounds having epoxy groups, and mixtures of particular tertiary amines (catalysts). The reactive resin mixtures are partly cured at temperatures up to 80° C. and fully cured at temperatures of 100 to 200° C. A disadvantage of these reactive resin mixtures is that they cure only at high temperatures and have long cycle times, which in turn leads to high energy and production costs.

WO 2008/147641 describes the production of a cured composition which is produced from blocked isocyanates, an epoxy resin and a catalyst, wherein at least one oxazolidone and isocyanurate ring is formed. The composition can be used as a coating material or for production of composite materials. It is a disadvantage of this composition that, in a multi-stage process, the polyurethane prepolymer first has to be prepared and then is converted to a blocked prepolymer which can be used as a reactive resin component.

WO 2012/022683 describes flat fiber composite components obtainable by impregnating fibers with a reactive resin mixture of polyisocyanates, polyepoxides, polyols and optionally additives, with no formation of any oxazolidinone ring. The reactive resins are cured at temperatures of 20 to 120° C. Disadvantages of these reactive resin mixtures are the long heat treatment time of several hours, and the rise in viscosity of the reaction mixture after mixing.

The reactive resins used to date have the disadvantage that it takes a long time until the reactive resin mixture has cured, which leads to low productivity. To increase the productivity, it is necessary to reduce the cycle time in the course of production. It is important here that the reactive resin mixture is mobile for long enough to completely impregnate the fibers, especially in the case of large moldings. On the other hand, the curing time should be very short, in order to reduce the cycle time. For economic reasons, a low curing temperature is desirable, since energy costs can be saved thereby. For safety reasons, a high flame retardancy of the fiber composite components is a desirable property, since it increases the safety of the end use (for example a rotor blade, a bodywork part).

It was therefore an object of the present invention to provide a matrix material which enables good impregnation and wetting of the fibers, is mobile for a long time (has a long pot life), and simultaneously assures rapid curing and good mechanical properties. At the same time, the finished molding should have good heat stability.

This object was surprisingly achieved through fiber composite components obtainable from fibers and reactive resin mixtures of polyisocyanates, polyepoxides, polyols, latent catalysts and optionally customary additives, using a large excess of isocyanate groups in relation to the number of OH groups.

The invention provides fiber composite components based on polyisocyanurate and on polyurethane, comprising one or more fiber layers impregnated with polyurethane and polyisocyanurate, wherein the polyurethane and polyisocyanurate are obtainable from a reaction mixture consisting of A) one or more polyisocyanates
B) one or more polyols
C) one or more polyepoxides
D) one or more latent catalysts and
E) optionally additives
F) optionally fiber material, wherein the mixture has a viscosity at 25° C. of 20 to 500 mPas, preferably 50 to 400 mPas, more preferably 60 to 350 mPas (measured to DIN EN ISO 1342), a ratio of the number of NCO groups in component A) to the number of OH groups in component B) of 10:1 to 16:1, preferably 11:1 to 14:1, a ratio of the number of NCO groups in component A) to the number of epoxy groups in component C) of 2:1 to 25:1, preferably 7:1 to 15:1, most preferably 10:1 to 14:1, and a ratio of the number of epoxy groups in component C) to the number of moles of latent catalyst in component D) of 1.1:1 to 12:1, preferably 3:1 to 10:1, most preferably 5:1 to 7:1.

Polyisocyanurates (PIR) form through the trimerization of isocyanate groups. The isocyanurate ring is very stable. At the start, the isocyanates react preferably with polyols to give polyurethanes. Later, when most of the OH groups have reacted, there is polyisocyanurate formation. The inventive fiber-reinforced fiber composite components are compact and optically transparent, and have good heat stability.

The polyurethane/polyisocyanurate does not contain any oxazolidinone groups in principle. If, contrary to expectation, oxazolidinone groups should actually occur in the polyurethane/polyisocyanurate as a result of minor side reaction, the content thereof is below 5% by weight based on polyurethane/polyisocyanurate. The oxazolidinone groups form when polyisocyanates react with epoxides. These are not disruptive in the fiber composite component.

The viscosity is determined to DIN EN ISO 1342 and in accordance with the details in the examples section.

The polyurethane/polyisocyanurate matrix of the fiber composite material contains a polyisocyanurate content of 55%-85% by weight, preferably of 65%-75% by weight.

The filler content in the fiber composite component is preferably more than 50% by weight, more preferably more than 55% by weight, based on the total weight of the fiber composite component. In the case of glass fibers, the fiber content can be determined subsequently, for example, by ashing and the weight can be checked.

The fiber composite component, preferably the glass fiber composite component, may be optically transparent. Because of the transparency, the component can directly be examined optically, for example for inclusions of air.

It is possible to utilize the known processes for production of components for the inventive composite components, for example manual lamination (wet compression methods), transfer molding, mold compression (SMC=sheet molding compound or BMC=bulk molding compound), resin injection methods (=resin transfer molding) or vacuum-assisted infusion methods (for example VARTM (vacuum-assisted resin transfer molding)) or prepreg technology.

The invention further provides a process for producing the inventive fiber composite components, by a) producing a mixture of
   A) one or more polyisocyanates
   B) one or more polyols
   C) one or more polyepoxides
   D) one or more latent catalysts
   E) optionally additives
   F) optionally fiber material,
   wherein the mixture has a viscosity at 25° C. of 20 to 500 mPas, preferably 50 to 400 mPas, more preferably 60 to 350 mPas (measured to DIN EN ISO 1342), a ratio of the number of NCO groups in component A) to the number of OH groups in component B) of 10:1 to 16:1, preferably 11:1 to 14:1, a ratio of the number of NCO groups in component A) to the number of epoxy groups in component C) of 2:1 to 25:1, preferably 7:1 to 15:1, most preferably 10:1 to 14:1, and a ratio of the number of epoxy groups in component C) to the number of moles of latent catalyst in component D) of 1.1:1 to 12:1, preferably 3:1 to 10:1, most preferably 5:1 to 7:1,
b) optionally, initially charging a fiber material in one half of a mold,
c) introducing the mixture produced in a) into the mold, with impregnation of any fiber material initially charged in step b),
d) curing the mixture at a temperature of 50° C. to 170° C., preferably of 110° C. to 140° C., with use of fiber material in the mixture in step a) or in step b) or in both steps a) and b).

Preferably, the mold half is provided with a separating agent before the fiber material or the reaction mixture is introduced. It is possible to introduce further protective or decorative layers into the mold half prior to the introduction of the fiber material or the reaction mixture, for example one or more gelcoat layers. Decorative layers may consist of different materials according to the desired properties. Decorative layers used may, for example, be commonly known, especially thermoplastic, compact or foamed films, for example based on acrylonitrile-butadiene-styrene (ABS), polymethylmethacrylate (PMMA), acrylonitrile-styrene-acrylic ester (ASA), polycarbonate (PC), thermoplastic polyurethane, polypropylene, polyethylene and/or polyvinyl chloride (PVC). In addition, it is also possible to use coated or painted films. Useful decorative layers also include all customary metal foils, for example aluminum foil or steel foil. In addition, it is also possible to use flat textiles, paper, wood (e.g. veneers), or else sprayable or RIM skins of polyurethane, as decorative layer. The decorative surface layer may form the front and also the reverse surface of the fiber composite component, or else both surfaces.

In the preferred RTM method (resin transfer molding), after the fiber material has been inserted into the mold, the mold is closed with an opposite half of the mold, a reduced pressure may be generated in the mold, and then the reaction mixture is introduced under pressure. If necessary, what are called flow aids (for example in the form of pressure-stable but resin-permeable mats) can be introduced between the mold halves and the fiber material, and these can be removed again after the curing.

The reactive resin mixtures used in accordance with the invention have low viscosities, long processing times and short curing times at low curing temperatures, and thus enable the rapid production of fiber composite components.

A further advantage of the reactive resin mixtures used in accordance with the invention is the improved processing characteristics as a result of rapid compatibility of the mixture of polyol and polyepoxide with the polyisocyanate. In the systems used to date, composed of polyisocyanates and polyols, the components have to be mixed beforehand for several minutes, since it is only through the commencement of urethane formation that compatibility of the components and homogeneity of the mixture is achieved, which is necessary for the processing. Otherwise, there would be incomplete curing and inhomogeneous products. The components of the reactive resin mixtures can be mixed at 20 to 100° C., preferably at 25 to 70° C., and applied to the fiber material.

In order to assure good impregnation of the fibers, the reactive resin mixture in the filling operation should preferably be mobile and remain mobile for a maximum period. This is necessary particularly in the case of large components, since the filling time is very long here. Preferably, the viscosity of the inventive reactive resin mixtures at 25° C. directly after mixing is between 20 and 500 mPas, preferably between 50 and 400 mPas, more preferably between 60 and 350 mPas. Preferably, the viscosity of the inventive reactive resin mixtures at a constant temperature of 25° C. 30 minutes after the components have been mixed is less than 800 mPas, preferably less than 500 mPas and more preferably less than 300 mPas. The viscosity was determined 30 minutes after the components had been mixed at a constant temperature of 25° C. with a rotary viscometer at a shear rate of 60 i/s. In the case of use of fiber material F) in polyol component B), a low viscosity of the reactive resin mixture is likewise advantageous, such that not only a high filler content but also good impregnation of the fiber mats is assured.

The reaction mixtures used in accordance with the invention can be processed on casting machines with static mixers or with dynamic mixers, since only a short mixing time is required. This is highly advantageous in the production of the inventive fiber composite components, since the reaction mixture must have maximum mobility for good impregnation. A noninventive mixture which first has to be mixed for a few minutes beforehand already shows too high a viscosity as a result of the formation of urethane groups.

A further advantage of the reaction mixture used in accordance with the invention is that it can be processed in a one-stage process, and that a low curing temperature of below 140° C. is sufficient.

As polyisocyanate component A), the customary aliphatic, cycloaliphatic and especially aromatic di- and/or polyisocyanates are used. Examples of such suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethyihexamethylene diisocyanate, the isomeric bis(4,4'-isocyanatocyclohexyl)methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (pMDI), 1,3- and/or 1,4-bis (2-isocyanatoprop-2-yl)benzene (TMXDI), 1,3-bis(isocyanatomethyl)benzene (XDI). As well as the aforementioned polyisocyanates, it is also possible to use proportions of modified polyisocyanates having uretdione, isocyanurate, urethane, carbodiimide, uretonimine, allophanate or biuret structure. Isocyanates used are preferably diphenylmethane diisocyanate (MDI) and especially mixtures of diphenylmethane diisocyanate and polyphenylenepolymethylene polyisocyanate (pMDI). The mixtures of diphenylmethane diisocyanate and polyphenylenepolymethylene polyisocyanate (pMDI) have a preferred monomer content of between 60% and 100% by weight, preferably between 70% and 95% by weight, more preferably between 80% and 90% by weight. The NCO content of the polyisocyanate used should preferably be more than 25% by weight, more preferably more than 30% by weight, especially preferably more than 32% by weight. The NCO content can be determined to DIN 53185. The viscosity of the isocyanate should preferably be ≤250 mPas (at 25° C.), more preferably ≤50 mPas (at 25° C.) and especially preferably ≤30 mPas (at 25° C.).

The polyols B) may have, for example, a number-average molecular weight $M_n$ of ≥200 g/mol to ≤8000 g/mol, preferably of ≥500 g/mol to ≤5000 g/mol and more preferably of ≥1000 g/mol to ≤3000 g/mol. The OH number of component B) in the case of a single added polyol is its OH number. In the case of mixtures, the number-average OH number is reported. This value can be determined with reference to DIN 53240. The polyol formulation preferably contains, as polyols, those which have a number-average OH number of 25 to 1000 mg KOH/g, preferably of 30 to 400 mg KOH/g and more preferably of 40 to 80 mg KOH/g. The viscosity of the polyols is preferably ≤800 mPas (at 25° C.). The polyols preferably have at least 60% secondary OH groups, preferably at least 80% secondary OH groups and more preferably 90% secondary OH groups. Polyether polyols based on propylene oxide are particularly preferred. Preferably, the polyols used have a mean functionality of 1.8 to 4.0, more preferably 1.9 to 2.5.

According to the invention, it is possible to use polyether polyols, polyester polyols or polycarbonate polyols. Suitable polyether polyols are addition products of styrene oxide, ethylene oxide, propylene oxide and/or butylene oxide onto di- or polyfunctional starter molecules. Suitable starter molecules are, for example, water, ethylene glycol, diethylene glycol, butyl diglycol, glycerol, diethylene glycol, trimethylolpropane, propylene glycol, pentaerythritol, ethylenediamine, toluenediamine, triethanolamine, butane-1,4-diol, hexane-1,6-diol and low molecular weight hydroxyl-containing esters of such polyols with dicarboxylic acids or oils having hydroxyl groups.

The polyols B) may also contain fibers, fillers and polymers.

Polyepoxides C) of particularly good suitability are low-viscosity aliphatic, cycloaliphatic or aromatic epoxides and mixtures thereof. The polyepoxides can be prepared by reaction of epoxides, for example epichlorohydrin, with alcohols. Alcohols used may, for example, be bisphenol A, bisphenol F, bisphenol S, cyclohexanedimethanol, phenyl-formaldehyde resins, cresol-formaldehyde novolaks, butanediol, hexanediol, trimethylolpropane or polyether polyols. It is also possible to use glycidyl esters, for example of phthalic acid, isophthalic acid or terephthalic acid and mixtures thereof. Epoxides can also be prepared through the epoxidation of organic compounds containing double bonds, for example through the epoxidation of fatty oils, such as soya oil, to epoxidized soya oil. The polyepoxides may also contain monofunctional epoxides as reactive diluents. These can be prepared by the reaction of alcohols with epichlorohydrin, for example monoglycidyl ethers of C4-C18 alcohols, cresol, p-tert-butylphenol. Further usable polyepoxides are described, for example, in "Handbook of Epoxy resins" by Henry Lee and Kris Neville, McGraw-Hill Book Company, 1967. Preference is given to using glycidyl ethers of bisphenol A having an epoxy equivalent weight in the range of 170-250 g/eq, more preferably having an epoxy equivalent value in the range from 176 to 196 g/eq. The epoxy equivalent value can be determined to ASTM D-1652. For example, it is possible for this purpose to use Eurepox 710 or Araldite® GY-250.

As latent catalysts D), catalysts are preferably used having catalytic activity in the range between 50° C. and 120° C. Typical latent catalysts are, for example, blocked amine and amidine catalysts from the manufacturers Air Products (for example Polycat® SA-1/10, Dabco KTM 60) and Tosoh Corporation (for example Toyocat® DB 2, DB 30, DB 31, DB 40, DB 41, DB 42, DB 60, DB 70) and Huntsman Corporation (for example Accelerator DY 9577). It is also possible to use all other typical latent catalysts from polyurethane chemistry having a so-called switching temperature of 50° C. to 120° C.

Latent catalysts D) used may be the known catalysts, usually bases (tertiary amines, salts of weak acids such as potassium acetate) and organic metal compounds. Preferred latently reactive catalysts are salts of tertiary amines. These latently reactive catalysts can be obtained, for example, by chemical blocking of a catalytically active amine. The chemical blocking can be effected by the protonation of a tertiary amine with an acid, for example formic acid, acetic acid, ethylhexanoic acid or oleic acid, or of a phenol or by boron trichloride. Trialkylamines and heterocyclic amines may be used as the amine, for example trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, dimethyloctylamine, triisopropanolamine, triethylenediamine, tetramethyl-1,3-butanediamine, N,N,N',N'-tetramethylethylenediamine, N,N,N',N'-tetramethylhexane-1,6-diamine, N,N,N',N',N''-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethylamino)piperidine, 1,4-diazabicyclo[2.2.2]octane, 1,8-diazabicyclo[5.4.0]undec-7-ene and 1,5-diazabicyclo[4.3.0]-5-nonane.

Examples of commercially available latently reactive catalysts are Polycat® SA1/10 (phenol-blocked 1,8-diazabicyclo[5.4.0]undec-7-ene (=DBU)), Polycat® SA 102/10, DABCO® 8154 (formic acid-blocked triethylenediamine) or DABCO® WT. Particular preference is given to trichloro(N,N-dimethyloctylamino)boron.

It is optionally possible to add additives E). These are, for example, additional catalysts, deaerators, defoamers, inhibitors, fillers and reinforcers. Further known additives and additions can be used if required.

To improve fire resistance, flame retardants may additionally be added to the matrix, for example phosphorus compounds, particularly phosphates and phosphonates, and also halogenated polyesters and polyols or chloroparaffins. In addition, it is also possible to add nonvolatile flame retardants such as melamine or expandable graphite, which expands significantly when exposed to flames and in the process seals the surface from further heating.

Fiber materials used may be sized or unsized fibers, for example glass fibers, carbon fibers, steel or iron fibers, natural fibers, aramid fibers, polyethylene fibers, basalt fibers or carbon nanotubes (CNTs). Particular preference is given to glass fibers and carbon fibers. The fibers may have lengths of 0.4 to 5000 mm, preferably 0.4 to 2000 mm, more preferably 0.4 to 1000 mm. It is also possible to use what are called short fibers having a length of 0.4 to 50 mm. Continuous fiber-reinforced composite components can be produced by the use of continuous fibers. The fibers may be arranged in the fiber layer unidirectionally, in random distribution or in interwoven form. In components having a fiber layer composed of multiple plies, there is the option of fiber orientation from ply to ply. It is possible here to produce unidirectional fiber layers, cross-bonded layers or multidirectional fiber layers, with unidirectional or interwoven plies layered one on top of another. Particular preference is given to using semifinished fiber products as fiber material, for example wovens, scrims, braids, mats, nonwovens, loop-drawn knits and loop-formed knits, or 3D semifinished fiber products.

The inventive fiber composite components can be used to produce bodywork components of automobiles or in aircraft construction, for production of rotor blades of wind power plants, and in components for construction of buildings and roads and other highly stressed structures.

The invention is to be illustrated in more detail by the examples which follow.

EXAMPLES

Inventive reactive resin mixtures and fiber-reinforced composite components formed from polyisocyanates, polyols, polyepoxides and latent catalysts were produced and compared with noninventive reactive resin mixtures and optionally composite components formed from polyisocyanates, polyols and polyepoxides, optionally with latent or non-latent catalysts.

For the production of the fiber-reinforced composite component in the RTM method (example 1 and 4), a glass fiber fabric (0°/90° glass fiber fabric from Hexcel, 1102-290-0800, 290 g/m$^2$, K2/2) was inserted into the mold, such that a glass fiber content of about 75% by weight, based on the later component, was attained. The subsequently closed mold was heated to 130° C. and the reaction mixture was subsequently forced into the mold under pressure, and the finished fiber composite component was demolded after 15 minutes.

For the production of the fiber-reinforced composite component in the vacuum infusion method (VARTM, example 2 and 3), a Teflon tube having a diameter of 6 mm was filled with glass fiber rovings (Vetrotex® EC2400 P207), so as to attain a glass fiber content of about 65% by weight, based on the later component. One end of the Teflon tube was immersed into the reaction mixture and vacuum was applied with an oil pump at the other end, the result of which was that the reaction mixture was sucked in. Once the tubes were filled, they were heat-treated at 80° C. The Teflon tube was removed.

The mechanical measurements were made on the fiber-reinforced specimens. The glass fiber content was determined by ashing the specimens to DIN EN ISO 1172. Flexural strength and flexural elongation was determined by a 3-point bending test to DIN EN ISO 178 (RTM components) or 3597-2 (VARTM components).

Viscosity was determined directly after mixing and 60 minutes after mixing of the components with a rotary viscometer at 25° C. at a shear rate of 60 l/s to DIN EN ISO 1342.

For the determination of flame retardancy, vertical flame spread on edge flaming was determined by a small burner test based on DIN 53438-2.

In the context of this patent application, the index is understood to mean the ratio of NCO/OH groups.

The hydroxyl number (OH number) means all the OH-functional constituents of the inventive reaction mixture.

Measuring Instruments Used:

DSC: DSC Q 20 V24.8 Build 120 instrument from Texas Instruments

Viscometer: MCR 501 from Anton Paar

Example 1

60 g of a polyether polyol having an OH number of 56 mg KOH/g and a functionality of 2 (viscosity at 25° C.: 400±50 mPas; 1,2-propylene glycol as starter, based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluene-sulphonate and degassed at a pressure of 1 mbar for 60 min. Thereafter, 214 g of Desmodurr VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro (N,N-dimethyloctylamino)boron from Huntsman Corporation, m.p. 25-36° C.), added to the polyol formulation and degassed while stirring at 1 mbar for 5 minutes. Thereafter, the reaction mixture was used to produce a fiber-reinforced component by the RTM method.

Example 2

60 g of a polyether polyol having an OH number of 56 mg KOH/g and a functionality of 2 (viscosity at 25° C.: 400±50 mPas; 1,2-propylene glycol as starter, based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluene-sulphonate and degassed at a pressure of 1 mbar for 60 min. Thereafter, 214 g of Desmodure VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro (N,N-dimethyloctylamino)boron from Huntsman Corporation, m.p. 25-36° C.), added to the polyol formulation and degassed while stirring at 1 mbar for 5 minutes. Thereafter, the reaction mixture was used to produce a fiber-reinforced component by the vacuum infusion method.

Comparative Example 3

30 g of a polyether polyol having an OH number of 380 mg KOH/g and a functionality of 3 (viscosity at 25° C.: 600±50 mPas; trimethylolpropane as starter; based on propylene oxide) were mixed with 30 g of Eurepox® 710 (bisphenol A epichlorohydrin resin with average molecular weight ≤700 g/mol; epoxy equivalent 183-189 g/eq; viscosity at 25° C.: 10 000-12 000 mPas) and degassed at a pressure of 1 mbar for 60 min. Thereafter, 53.03 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were added and the mixture was degassed while stirring at 1 mbar for 5 minutes. Thereafter, the reaction mixture was used to produce a fiber-reinforced component by the vacuum infusion method.

Comparative Example 4

60 g of a polyether polyol having an OH number of 56 mg KOH/g and a functionality of 2 (viscosity at 25° C.: 400±50 mPas; 1,2-propylene glycol as starter, based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 min. Thereafter, 214 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 38.5 g of DY 9577® (trichloro(N,N-dimethyloctylamino)boron from Huntsman Corporation, m.p. 25-36° C.), added to the polyol formulation and degassed while stirring at 1 mbar for 5 minutes. It was impossible to produce a fiber-reinforced component with the reaction mixture by the RTM method.

Comparative Example 5

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 min. Thereafter, 103.6 g of Desmodurr VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro (N,N-dimethyloctylamino)boron from Huntsman Corporation, m.p. 25-36° C.), added to the polyol formulation and degassed while stirring at 1 mbar for 5 minutes. The viscosity of the reaction mixture directly after mixing was 1850 mPas at 25° C. and increased very quickly. Therefore, it was impossible to produce a fiber-reinforced component by the RTM and VARTM methods.

Comparative Example 6

60 g of a polyether polyol having an OH number of 56 mg KOH/g and a functionality of 2 (viscosity at 25° C.: 400±50 mPas; 1,2-propylene glycol as starter, based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 min. Thereafter, 214 g of Desmodurr VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 2.95 g of Desmorapid DB (N,N-dimethylbenzylamine from Rhein Chemie Rheinau GmbH, liquid at room temperature), added to the polyol formulation and degassed while stirring at 1 mbar for 5 minutes. The viscosity rose too quickly during the production of the fiber-reinforced components by the RTM and VARTM methods, and prevented the production of fiber composite components.

Comparative Example 7

60 g of a polyether polyol having an OH number of 56 mg KOH/g and a functionality of 2 (viscosity at 25° C.: 400±50 mPas; 1,2-propylene glycol as starter, based on propylene oxide) were mixed with 26 g of Eurepox® 710 (bisphenol A epichlorohydrin resin with average molecular weight ≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 min. Thereafter, 20.7 g of Desmodurr VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro (N,N-dimethyloctylamino)boron from Huntsman Corporation, m.p. 25-36° C.), added to the polyol formulation and degassed while stirring at 1 mbar for 5 minutes. The viscosity of the reaction mixture directly after mixing was 2060 mPas at 25° C. and increased very quickly. Therefore, it was impossible to produce fiber-reinforced components by the RTM and VARTM methods.

|  | Examples | | | |
| --- | --- | --- | --- | --- |
|  | 1 (RTM) | 2 (VARTM) | 3* (VARTM) (to WO 2012/ 022683) | 4* (RTM) |
| NCO/OH equivalents ratio | 12.4 | 12.4 | 1.4 | 12.4 |
| NCO/epoxide equivalents ratio | 11.4 | 11.4 | 2.6 | 11.4 |
| Epoxide/catalyst equivalents ratio | 6.4 | 6.4 | — | 1 |
| Viscosity (directly after mixing) [mPas] | 120 | 120 | 105 | 150 |
| Viscosity (60 min after mixing) [mPas] | 320 | 320 | 4230 | 350 |
| Viscosity 24 h after mixing (pot life) [mPas] | 340 | 340 | solid | >50 000 |
| Demolding time [min] | 15 (130° C.) | 360 (80° C.) | 600 (80° C.) | does not solidify (130° C.) |
| HDT to DIN ISO 75 [8 MPa] | >250° C. | — | — | — |
| Fire test (based on small burner test to DIN 53438-2) | passed | passed | failed | — |
| Glass transition temperature $T_g$ [° C.] to DIN EN ISO 53765 | 146 | 146 | 80 | — |
| Modulus of elasticity to DIN | 25400 | — | — | — |

-continued

|  |  |  |  |  |
|---|---|---|---|---|
| ISO 3597-2 |  |  |  |  |
| Glass fiber content to DIN EN ISO 1172 [% by wt.] | 75.0 | 65.0 | 64.0 | — |
| Flexural strength [MPa] | 770 (to ISO 178) | 862 (to ISO 3597-2) | 855 (to ISO 3597-2) | — |
| Flexural elongation [%] | 3.20 (to ISO 178) | 3.23 (to ISO 3597-2) | 3.08 (to ISO 3597-2) | — |
| Interlaminar shear strength, 0° direction (ShortBeam) | 54.40 (to ISO 14130) | 40.2 (to ISO 3597-4) | 43.76 (to ISO 3597-4) | — |

|  | Examples | | |
|---|---|---|---|
|  | 5* | 6* | 7* |
| NCO/OH equivalents ratio | 6.0 | 12.4 | 1.2 |
| NCO/epoxide equivalents ratio | 5.74 | 11.4 | 1.15 |
| Epoxide/catalyst equivalents ratio | 6.4 | 6.4 | 6.4 |
| Viscosity (directly after mixing) [mPas] | 1850 (25° C.) | 150 (25° C.) | 2060 (25° C.) |
| Viscosity (60 min after mixing) [mPas] | 3100 | solid | solid |
| Viscosity 24 h after mixing (pot life) [mPas] | solid | solid | solid |

*comparative examples

Inventive example 1 gives rise to a compact and optically transparent composite component having very good mechanical properties (modulus of elasticity exceeding 25 400 MPa, flexural elongation exceeding 3.20% and HDT value exceeding 250° C.). For the production of fiber-reinforced composite components, a very low viscosity in particular is needed, since this allows the fiber scrim or fabric to be soaked or impregnated more easily and better, and the molds to be filled much more quickly and homogeneously. This enables shorter cycle times since the molds are occupied only for a shorter time. Moreover, a long pot life is desirable specifically for large fiber composite components. In inventive example 1, the pot life is more than 24 h. Within this period, there was barely any rise in the viscosity of the system. At 130° C., the component cured very rapidly. No further heat treatment of the inventive fiber composite component was necessary, compared to the component from comparative example 3.

No comparative example with the prior art system according to WO 2012/022683 was possible by the RTM method, since the viscosity of the system rose much too quickly and requisite wetting of the glass fibers was inadequate.

Example 1 was repeated. However, the component in example 2 was produced by the VARTM method.

In comparative example 3, a molar NCO/OH ratio of 1.4 was employed. Since the reaction was very rapid, no catalyst was employed. The viscosity in comparative example 3 is already 4230 mPas 30 minutes after mixing at 25° C. Because of the rapid rise in viscosity, the filling operation takes longer, the cycle time rises significantly and the individual mold is utilized for longer, which leads to much higher costs. Moreover, it is more difficult to wet the fibers in the case of a higher viscosity, which can result in delamination in the finished fiber composite component.

The weights and ratios in comparative example 4 correspond to those from example 1, except that the equivalents ratio of epoxide to latent catalyst has been reduced from 6.4 to 1 by increasing the amount of catalyst added. The pot life is shortened here by nearly 40%. In addition, the matrix cannot be solidified completely at 130° C. Even after 60 minutes at 130° C., the material is partly in uncrosslinked form. It was thus not possible to produce a finished fiber composite component.

In comparative example 5, compared to inventive example 1, the NCO/OH equivalents ratio was reduced from 12.4 to 6, by reducing the amount of isocyanate used (Desmodur® VP.PU 60RE11). Correspondingly, the NCO/epoxide equivalents ratio was reduced from 11.4 to 5.74. As a result of the reduction in the NCO/OH equivalents ratio, the starting viscosity was about 1850 mPas at 25° C., and hence made it impossible to fill the mold homogeneously. Especially the fiber binding of the matrix resin is much more difficult at high viscosities. Moreover, the system from comparative example 5 did not give the long open pot life of more than 24 hours at room temperature as in inventive example 1, but was already solid after 4 hours. It was not possible to produce a finished fiber composite component. It was therefore also impossible to ascertain any further mechanical properties.

The weights and ratios in comparative example 6 corresponded to those from example 1, except that, rather than the latent Dy 9577® catalyst, a corresponding molar amount of non-latent catalyst was used, in this case Desmorapid DB. In this case too, the viscosity of the reaction mixture rose very rapidly, which made it impossible to fill the mold homogeneously, without defects. The open pot life was shortened here to just 25 min, and was thus more than 23 hours shorter than in inventive example 1. It was not possible to produce a finished fiber composite component. It was therefore also impossible to ascertain any further mechanical properties.

In comparative example 6, compared to inventive example 1, the NCO/OH equivalents ratio was reduced from 12.4 to 1.2, by reducing the amount of isocyanate used (Desmodur® VP.PU 60RE11). Correspondingly, the NCO/epoxide equivalents ratio was reduced from 11.4 to 1.15. As a result of the reduction in the NCO/OH equivalents ratio, the starting viscosity was about 2060 mPas at 25° C. and rose very significantly within a few minutes, and hence made it impossible to fill the mold homogeneously. Moreover, the system from comparative example 6 gave only a very short open pot life of less than 12 minutes. It was not possible to produce a finished fiber composite component. It was therefore also impossible to ascertain any further mechanical properties.

The very good mechanical characteristics and an HDT exceeding 250° C. in combination with a very low starting viscosity of 120 mPas and a constantly low viscosity for a very long period, which leads to high productivity in the production of large fiber-reinforced components, was achieved only with the inventive examples.

In the case of inventive examples 1 and 2, self-extinguishment occurred 55 seconds after the flame was removed, and the flame height was max. 60 mm. In contrast, no self-extinguishment occurred in the case of comparative example 3, and the flame height was greater than 150 mm. The component from comparative example 3 therefore failed the flame test.

The invention claimed is:

1. A fiber composite component based on polyisocyanurate and on polyurethane, comprising one or more fiber layers impregnated with polyurethane and polyisocyanurate, wherein the polyurethane and polyisocyanurate are obtained from a reaction mixture consisting of
   A) one or more polyisocyanates
   B) one or more polyols
   C) one or more polyepoxides
   D) one or more latent catalysts
   E) optionally additives and
   F) optionally fiber material, wherein the mixture has a viscosity at 25° C. of 50 to 400 mPas, measured to DIN EN ISO 1342, a ratio of the number of NCO groups in component A) to the number of OH groups in component B) of 11:1 to 14:1, a ratio of the number of NCO groups in component A) to the number of epoxy groups in component C) of 7:1 to 15:1, and a ratio of the number of epoxy groups in component C) to the number of moles of latent catalyst in component D) of 3:1 to 10:1.

2. The fiber composite according to claim 1 wherein the reaction mixture has a viscosity at 25° C. of 60 to 350 mPas as measured to DIN EN ISO 1342, a ratio of the number of NCO groups in component A) to the number of epoxy groups in component C) of 10:1 to 14:1, and a ratio of the number of epoxy groups in component C) to the number of moles of latent catalyst in component D) 5:1 to 7:1.

3. A process for producing the fiber composite components as claimed in claim 1, by
   a) producing a reaction mixture consisting of
      A) one or more polyisocyanates
      B) one or more polyols
      C) one or more polyepoxides
      D) one or more latent catalysts
      E) optionally additives
      F) optionally fiber material, wherein the mixture has a viscosity at 25° C. of 50 to 400 mPas, measured to DIN EN ISO 1342, a ratio of the number of NCO groups in component A) to the number of OH groups in component B) of 11:1 to 14:1, a ratio of the number of NCO groups in component A) to the number of epoxy groups in component C) of 7:1 to 15:1, and a ratio of the number of epoxy groups in component C) to the number of moles of latent catalyst in component D) of 3:1 to 10:1,
   b) optionally, initially charging a fiber material in one half of a mold,
   c) introducing the mixture produced in a) into the mold, with impregnation of any fiber material initially charged in step b), and
   d) curing the mixture at a temperature of 50° C. to 170° C., with use of fiber material in the mixture in step a) or in step b) or in both steps a) and b).

4. The process according to claim 3 wherein the reaction mixture has a viscosity at 25° C. of 60 to 350 mPas as measured to DIN EN ISO 1342, a ratio of the number of NCO groups in component A) to the number of epoxy groups in component C) of 10:1 to 14:1, and a ratio of the number of epoxy groups in component C) to the number of moles of latent catalyst in component D) of 5:1 to 7:1.

5. The process according to claim 3, wherein the reaction mixture is cured at a temperature of 110° C. to 140° C.

* * * * *